United States Patent
Kawai et al.

(10) Patent No.: US 10,914,422 B2
(45) Date of Patent: Feb. 9, 2021

(54) GREASE DISCHARGE DEVICE

(71) Applicant: MAKITA CORPORATION, Anjo (JP)

(72) Inventors: Tomofumi Kawai, Anjo (JP); Akihito Hara, Anjo (JP); Koji Tanaka, Anjo (JP); Yuki Miwa, Anjo (JP)

(73) Assignee: MAKITA CORPORATION, Anjo (JP)

( * ) Notice: Subject to any disclaimer, the term of this patent is extended or adjusted under 35 U.S.C. 154(b) by 287 days.

(21) Appl. No.: 15/963,512

(22) Filed: Apr. 26, 2018

(65) Prior Publication Data

US 2018/0340652 A1 Nov. 29, 2018

(30) Foreign Application Priority Data

May 25, 2017 (JP) .................................. 2017-103861

(51) Int. Cl.
*F16N 3/12* (2006.01)
*F16N 13/02* (2006.01)
*F16N 23/00* (2006.01)

(52) U.S. Cl.
CPC ............... *F16N 3/12* (2013.01); *F16N 13/02* (2013.01); *F16N 23/00* (2013.01)

(58) Field of Classification Search
CPC ...................................................... F16N 13/02
USPC ..................................................... 184/105.2
See application file for complete search history.

(56) References Cited

U.S. PATENT DOCUMENTS

| 1,750,148 | A | * | 3/1930 | Zabriskie | .................. | F16N 3/12 |
| | | | | | | 222/256 |
| 4,063,618 | A | * | 12/1977 | O'Dell | ...................... | F16N 5/02 |
| | | | | | | 184/105.2 |
| 7,377,406 | B2 | * | 5/2008 | Linkletter | ................. | F16N 3/12 |
| | | | | | | 184/105.2 |
| 2004/0231927 | A1 | * | 11/2004 | Huang | ................... | F16N 11/08 |
| | | | | | | 184/105.2 |

(Continued)

FOREIGN PATENT DOCUMENTS

CN 1800692 A 7/2006

OTHER PUBLICATIONS

Jun. 29, 2020 Office Action issued in Chinese Patent Application No. 201810393839.4.

(Continued)

*Primary Examiner* — Michael R Mansen
*Assistant Examiner* — Mark K Buse
(74) *Attorney, Agent, or Firm* — Oliff PLC

(57) ABSTRACT

A grease discharge device includes a motor, a plunger, a grease supply unit, a pump, a check valve, and a relief valve. The plunger reciprocates by driving of the motor. The grease supply unit supplies grease to a forward movement side with respect to a backward movement side dead center of the plunger. The pump performs a discharge behavior of the grease by the reciprocation of the plunger. The check valve is disposed at a downstream side with respect to a forward movement side dead center of the plunger in a discharge path of the grease inside the pump. The relief valve is disposed between a supply portion of the grease by the (Continued)

grease supply unit and the check valve. The relief valve releases the grease inside the discharge path to the grease supply unit side according to a pressure rise inside the discharge path.

16 Claims, 12 Drawing Sheets

(56) References Cited

U.S. PATENT DOCUMENTS

| | | | |
|---|---|---|---|
| 2006/0108180 A1* | 5/2006 | Grach | F16N 3/12 184/105.2 |
| 2006/0219482 A1 | 10/2006 | Tung | |
| 2010/0116850 A1* | 5/2010 | Weems | F16N 3/12 222/256 |
| 2013/0081903 A1* | 4/2013 | Alekseyev | F16N 3/12 184/26 |
| 2013/0341360 A1* | 12/2013 | Ryan | F16N 3/12 222/262 |
| 2015/0060496 A1* | 3/2015 | Rudolph | F16N 3/12 222/189.11 |

OTHER PUBLICATIONS

Dec. 1, 2020 Office Action issued in Japanese Patent Application No. 2017-103861.

\* cited by examiner

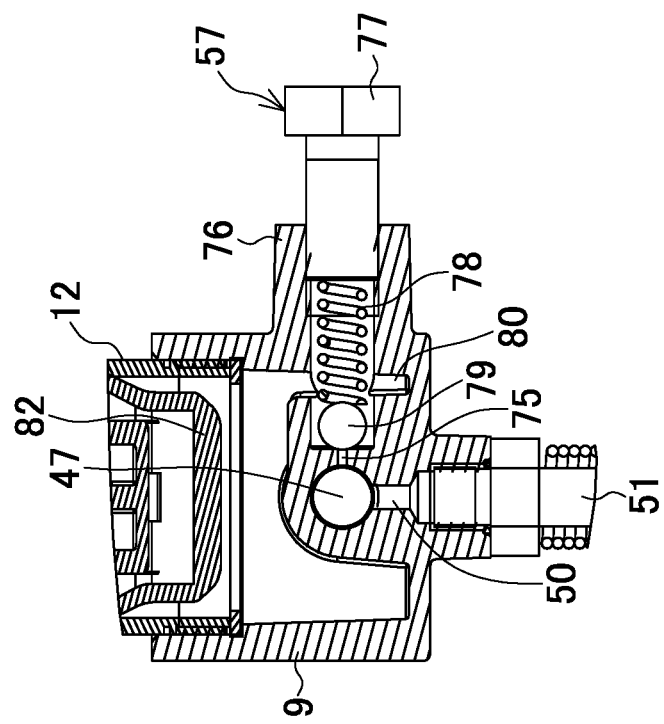
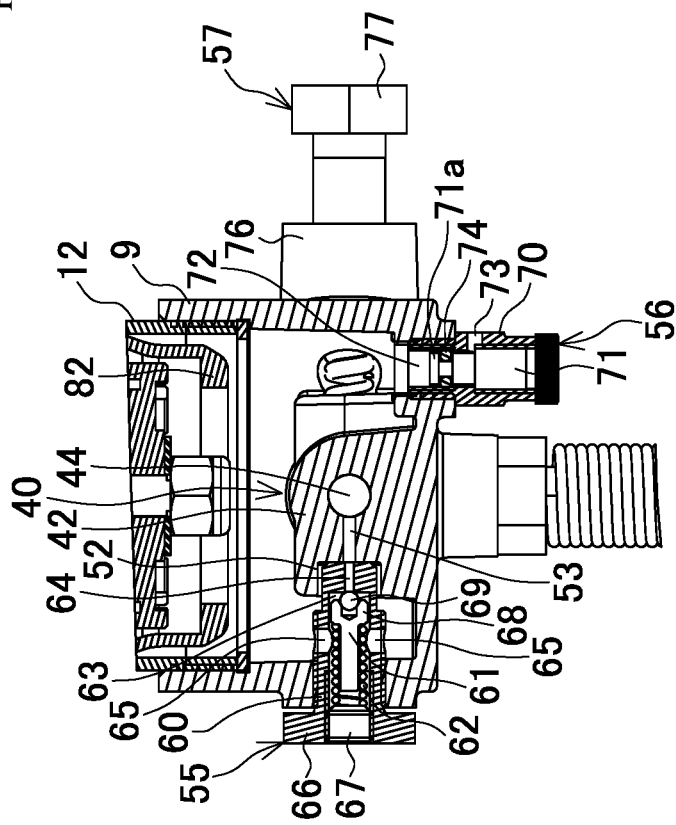

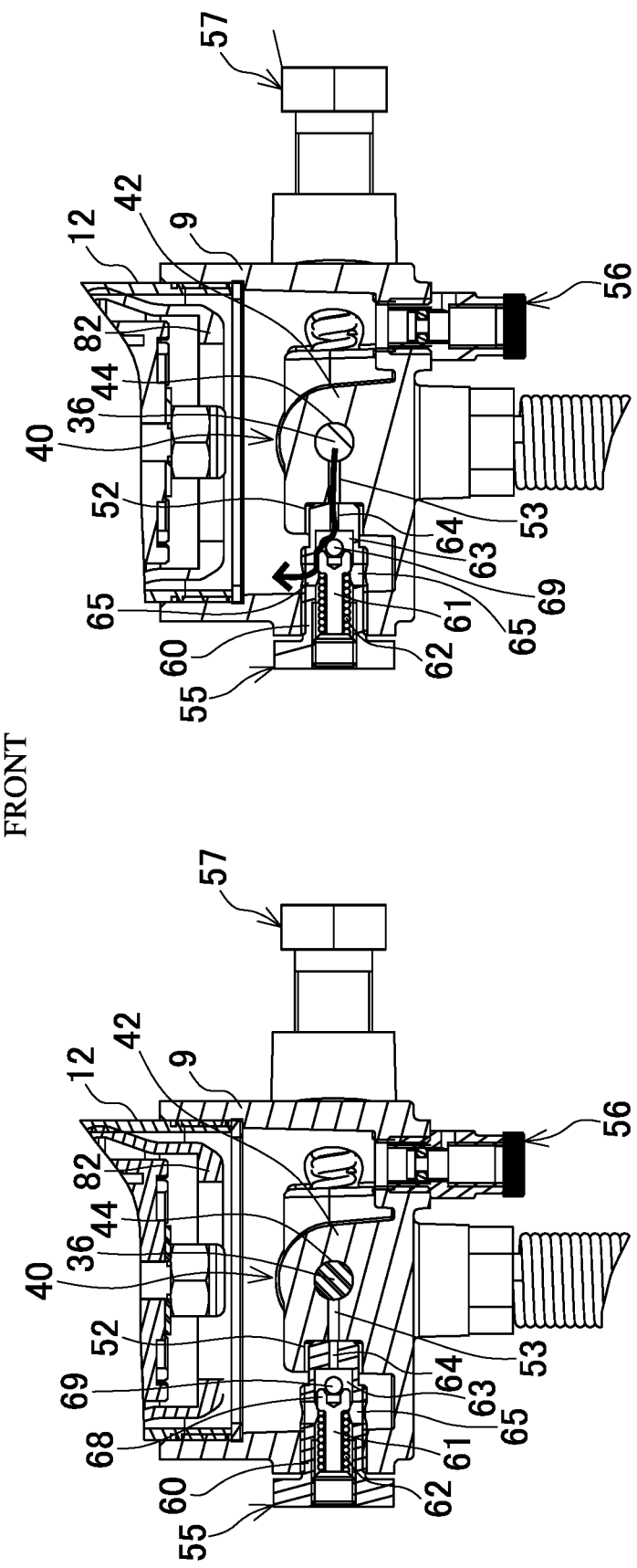

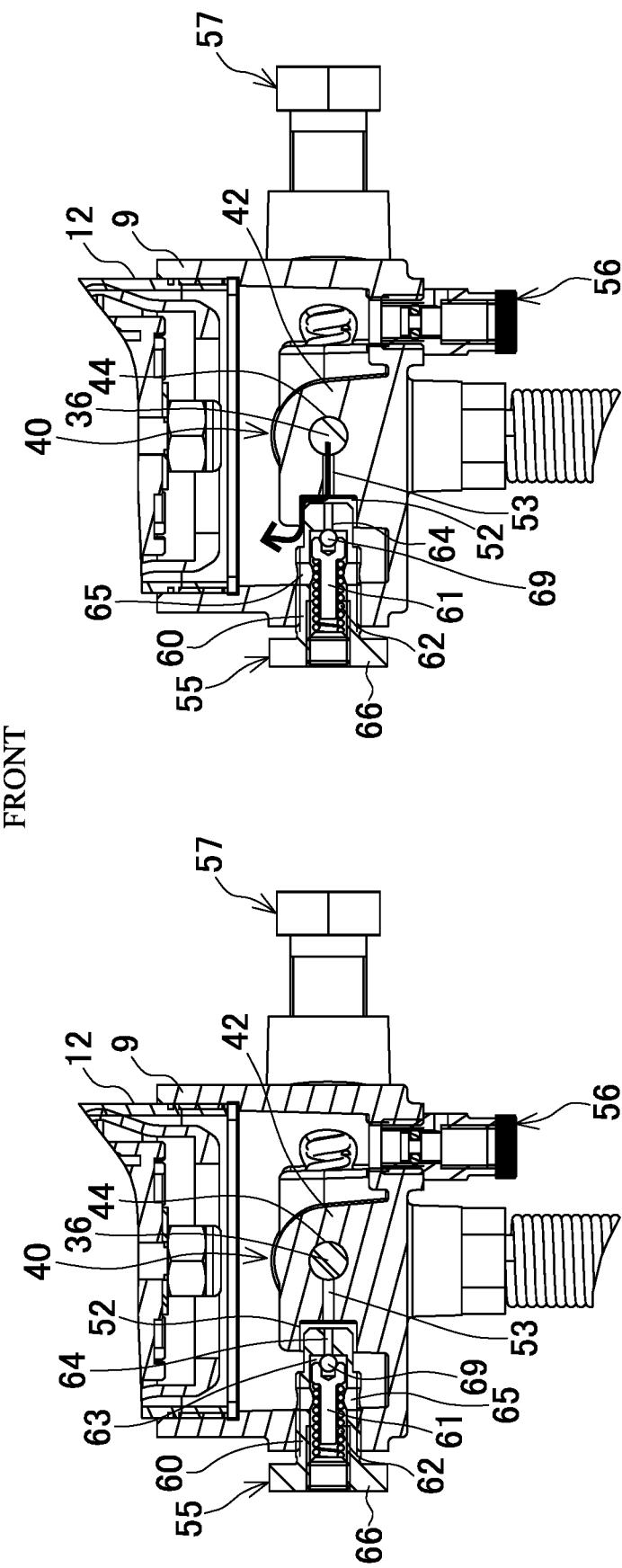

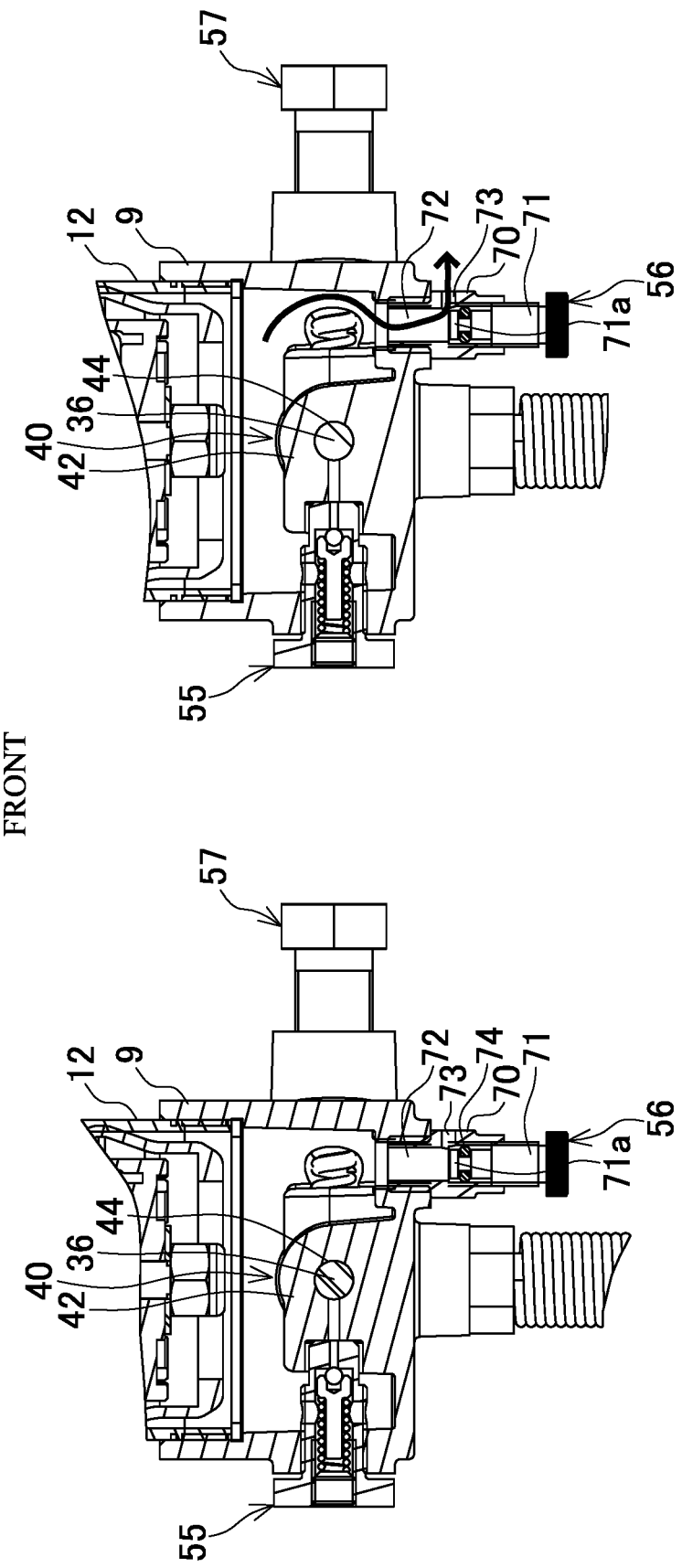

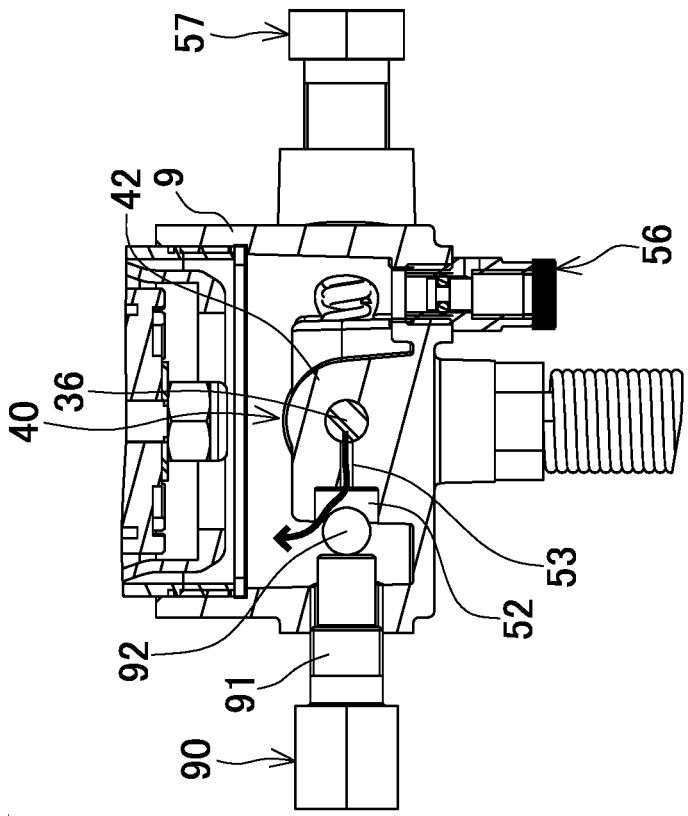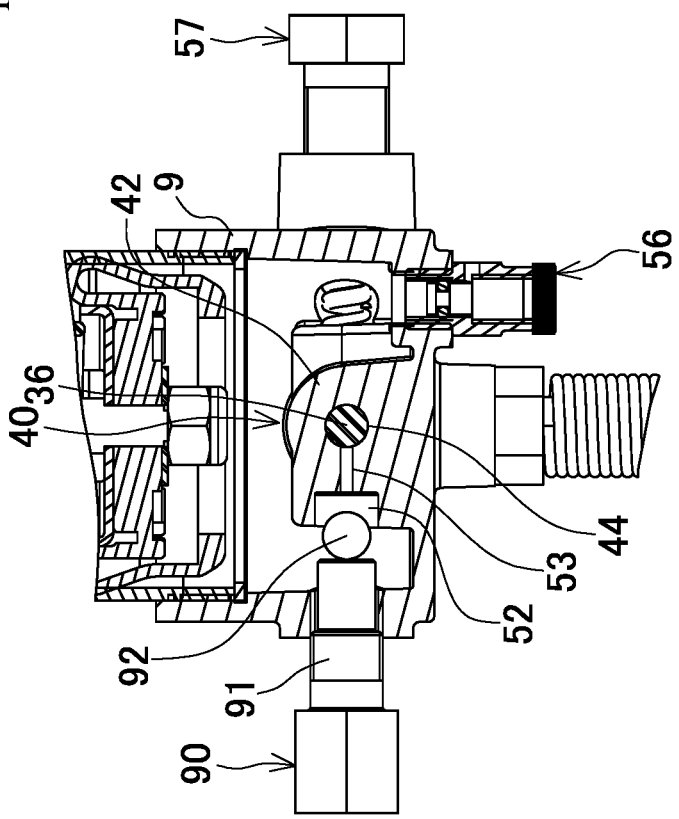

GREASE DISCHARGE DEVICE

BACKGROUND

This application claims the benefit of Japanese Patent Application Number 2017-103861 filed on May 25, 2017, the entirety of which is incorporated by reference.

TECHNICAL FIELD

The disclosure relates to a grease discharge device that can discharge lubricant (grease).

RELATED ART

As disclosed in U.S. Patent Application Publication No. 2006/0108180, a grease discharge device includes a tank that accumulates grease, a motor, a plunger that reciprocates by motor driving, and a pump operated by the reciprocation of the plunger. The grease inside the tank is discharged from a discharge port of the pump by the reciprocation of the plunger by the motor driving. Here, a planetary gear reduction mechanism is disposed between the motor and the pump, and an output speed is changeable by changing a position of internal gears by a lever operation. Thus, a switch operation of an amount of discharge is possible in two stages (high pressure/low amount of discharge and low pressure/high amount of discharge) according to work. Accordingly, even if a load pressure is high, a large current is prevented from flowing to an electronic material product such as a motor for protection of the electronic material product.

The conventional grease discharge device requires the operation of the lever to switch the amount of discharge. Therefore, the operation during work is troublesome, and if the switch operation is forgotten while the load pressure remains to be high, the electronic material product is possibly damaged.

Therefore, an object of the disclosure is to provide a grease discharge device that can easily change an amount of discharge and can preferably protect an electronic material product.

SUMMARY

In order to achieve the above-described object, there is provided a grease discharge device that includes a motor, a plunger, a grease supply unit, a pump, a check valve, and a relief valve. The plunger reciprocates by driving of the motor. The grease supply unit supplies grease to a forward movement side with respect to a backward movement side dead center of the plunger. The pump performs a discharge behavior of the grease by the reciprocation of the plunger. The check valve is disposed at a downstream side with respect to a forward movement side dead center of the plunger in a discharge path of the grease inside the pump. The relief valve is disposed between a supply portion of the grease by the grease supply unit and the check valve. The relief valve releases the grease inside the discharge path to the grease supply unit side according to a pressure rise inside the discharge path.

Preferably, the relief valve is constituted including a release flow passage and a valve element. The release flow passage communicates with the grease supply unit side. The valve element automatically performs an open and close behavior of the release flow passage according to increase and decrease of the pressure inside the discharge path.

Preferably, the valve element holds a steel ball at a distal end thereof. The steel ball is seated on the release flow passage.

Preferably, the valve element is housed inside a main body where the release flow passage is formed such that the valve element is configured to perform the open and close behavior. The valve element is biased to a valve closed position in the release flow passage with an elastic member.

The elastic member is preferably a coil spring.

Preferably, the main body has a tubular body screwed with a holder that houses the pump. The main body has a distal end projecting to an inside of the holder. A degree of opening of a communication flow passage disposed at the pump is adjustable as desired by a rotating operation of the main body. The communication flow passage communicates between the discharge path and the grease supply unit.

Preferably, the communication flow passage is constituted including a clearance depressed portion and a communication passage. The clearance depressed portion is disposed at the pump and has a diameter larger than a diameter of the distal end of the main body. The communication passage communicates between the clearance depressed portion and the discharge path.

Preferably, the release flow passage is constituted including an internal flow passage, a front flow passage, and a lateral flow passage. The internal flow passage houses the valve element. The front flow passage opens the internal flow passage to the distal end of the main body. The lateral flow passage opens the internal flow passage to a side face of the main body.

A clearance through which the grease is passable is preferably formed between the valve element and the internal flow passage.

Preferably, the relief valve is a manually operated valve configured to adjust a degree of opening of a communication flow passage disposed at the pump as desired. The communication flow passage communicates between the discharge path and the grease supply unit.

Preferably, the pump is constituted including an upper tubular portion through which the plunger is insertable and a lower tubular portion. The upper tubular portion projects downward from an upper inner surface of the holder. The lower tubular portion projects upward from a lower inner surface of the holder coaxially with the upper tubular portion. The lower tubular portion has a clearance with the upper tubular portion to communicate with the inside of the holder. The lower tubular portion forms the discharge path communicating with the clearance. The plunger is inserted through the discharge path.

The grease supply unit is preferably a tank having a front end coupled to the holder to be supported in a front-rear direction.

Meanwhile, another embodiment to achieve the object is a grease discharge device that includes a motor, a plunger, tubular portions, and an amount-of-discharge change means. The plunger reciprocates by driving of the motor. Into the tubular portions, the plunger is inserted and the plunger reciprocates. The amount-of-discharge change means makes an amount of discharge of grease changeable with a constant count of the reciprocations of the plunger per unit time.

According to the embodiments, the use of the relief valve or the amount-of-discharge change means ensures easily changing the amount of discharge. This configuration eliminates the need for the switch operation of the amount of discharge, ensuring preferably protecting the electronic material product.

Especially, automatically performing the open and close behaviors of the relief valve allows the automatic change of the amount of discharge in two stages, high and low.

Configuring the relief valve as the manually operated valve allows easily changing the amount of discharge and enhances the degree of freedom of adjustment of the released amount.

BRIEF DESCRIPTION OF THE DRAWINGS

FIG. 5A illustrates a cross-sectional surface taken along a line B-B in FIG. 4, and FIG. 5B illustrates a cross-sectional surface taken along a line C-C.

FIGS. 6A and 6B are explanatory diagrams illustrating a behavior of a relief valve at an automatic switch position, FIG. 6A illustrates a high load pressure/low amount of discharge state, and FIG. 6B illustrates a route to release grease in the state shown in FIG. 6A.

FIGS. 7A and 7B are explanatory diagrams illustrating a behavior of the relief valve at a manual open position, FIG. 7A illustrates the low amount of discharge state, and FIG. 7B illustrates a route to release the grease in the state shown in FIG. 7A.

FIGS. 8A and 8B are explanatory diagrams of an air valve, FIG. 8A illustrates an operating state, and FIG. 8B illustrates a route to vent air.

FIG. 9A illustrates an operating state, and FIG. 9B illustrates a route to release the grease in the state shown in FIG. 9A.

FIGS. 12A and 12B are explanatory diagrams of the manual relief valve, FIG. 12A illustrates the low amount of discharge state, and FIG. 12B illustrates a route to release the grease in the state shown in FIG. 12A.

DETAILED DESCRIPTION

The following describes an embodiment of the disclosure with reference to the drawings.

Figure 1:
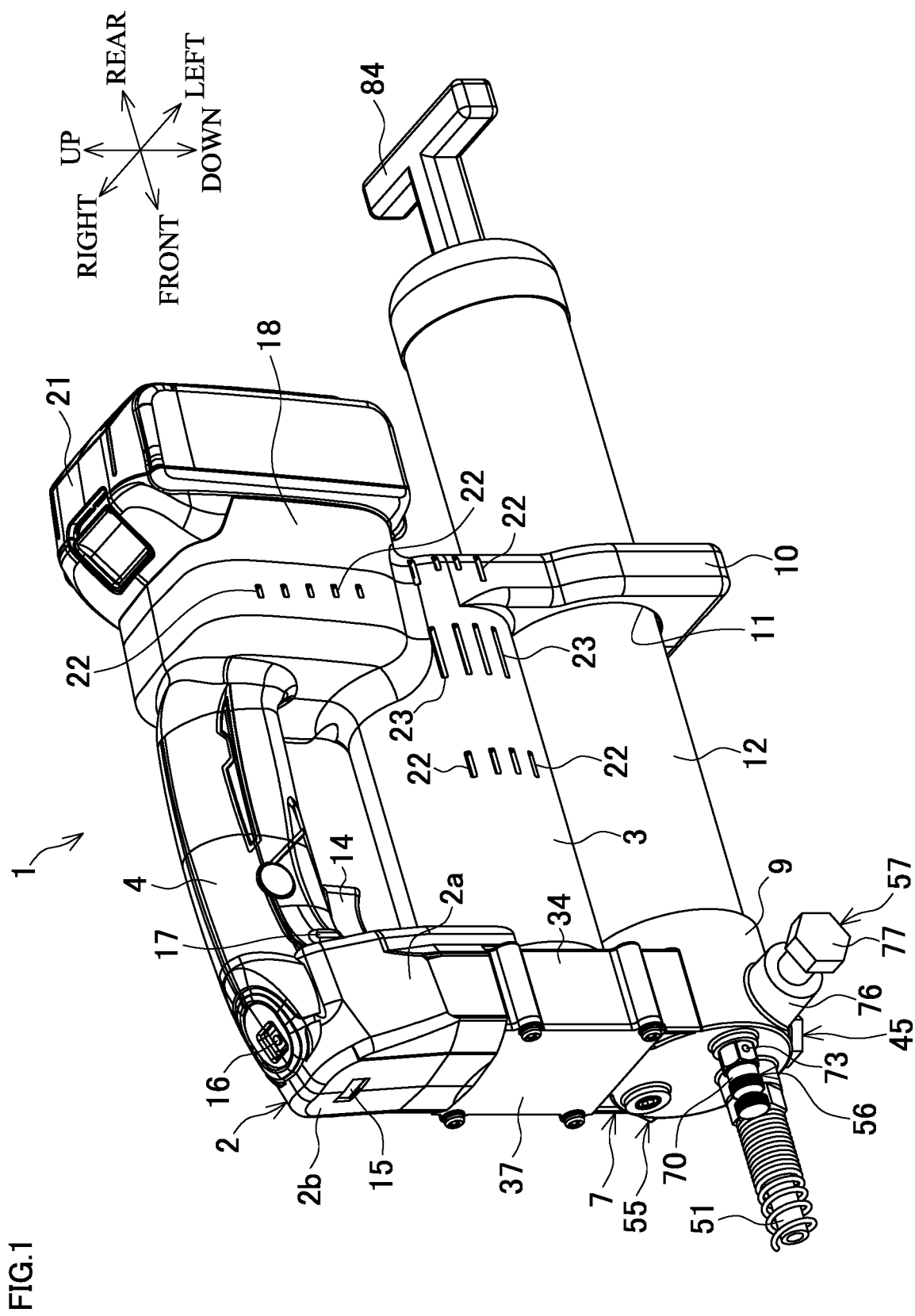
FIG. 1 is a perspective view of a grease gun.
Figure 2:
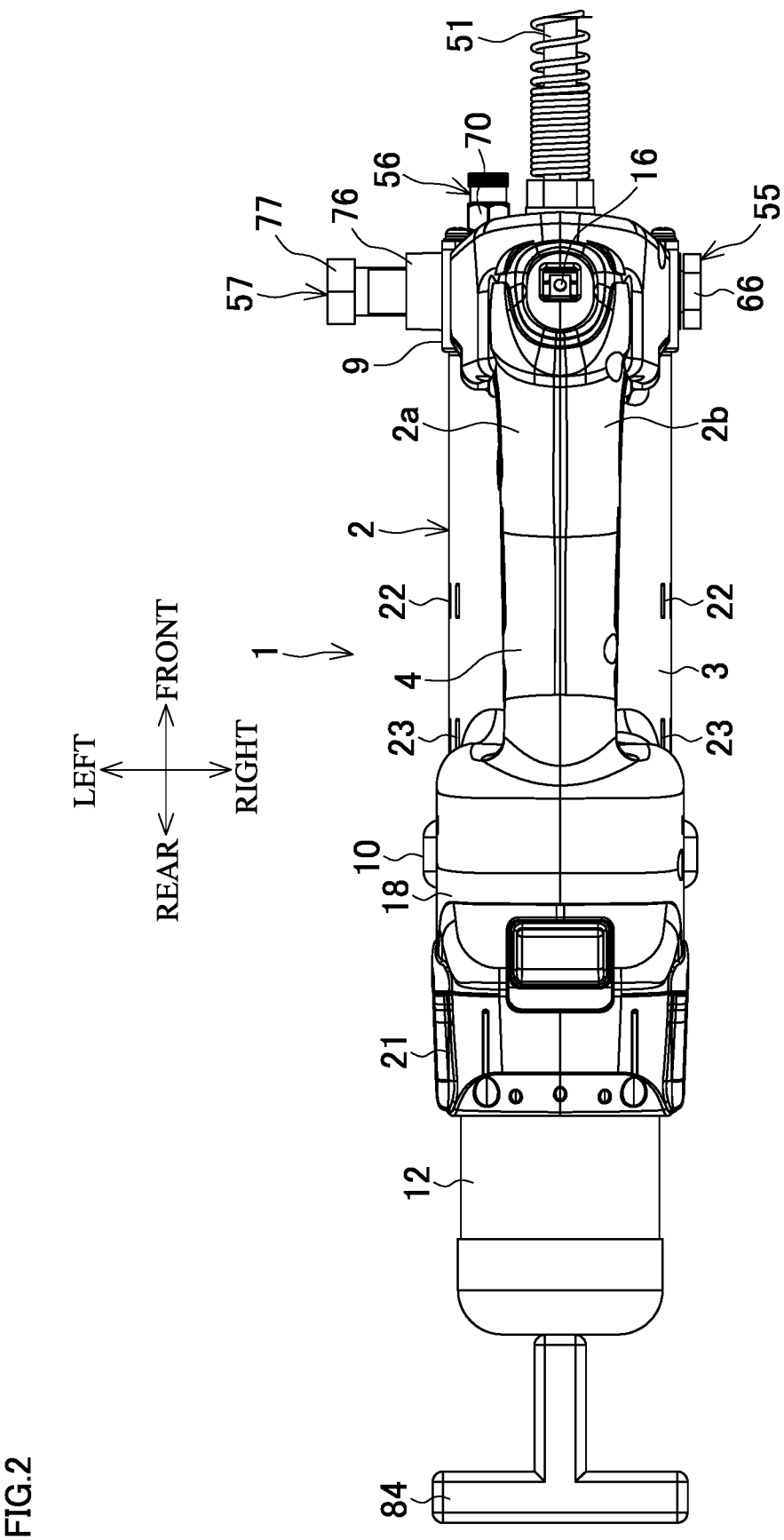
FIG. 2 is a plan view of the grease gun.
Figure 3:
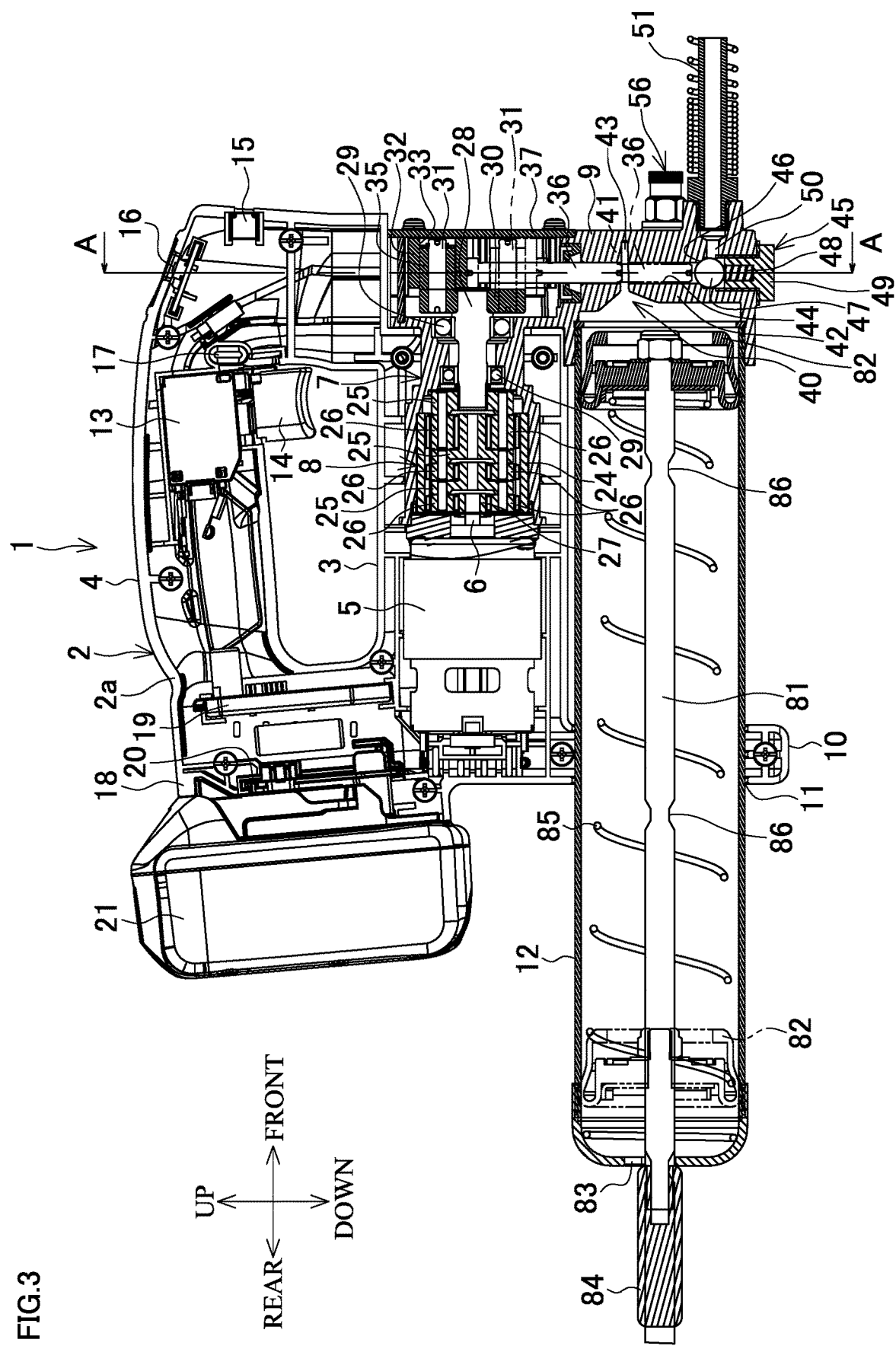
FIG. 3 is a longitudinal cross-sectional view of the grease gun.
Figure 4:
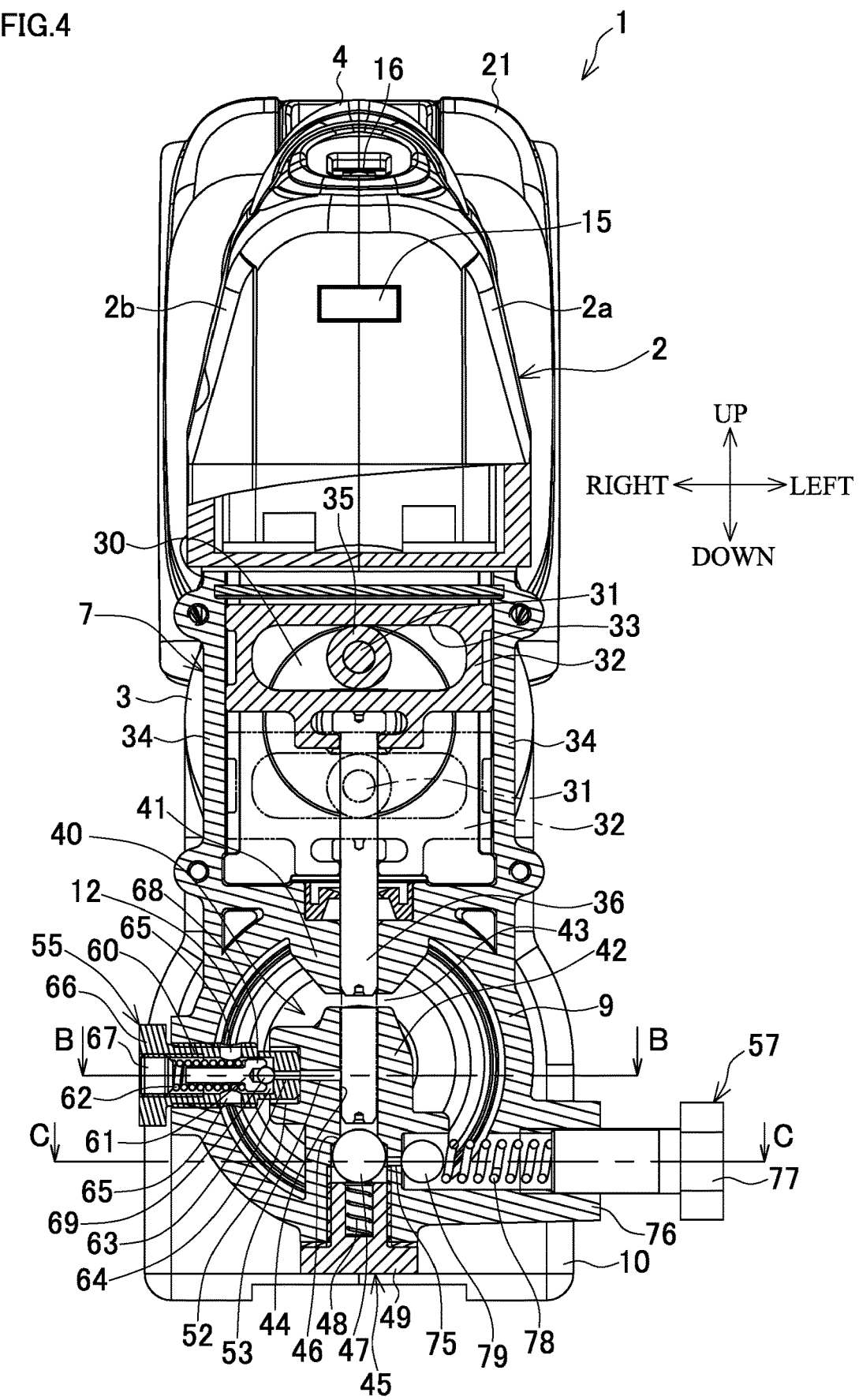
FIG. 4 is a cross-sectional view taken along a line A-A in FIG. 3.

FIG. 1 is a perspective view illustrating a grease gun as an example of a grease discharge device, FIG. 2 is the plan view, FIG. 3 is the longitudinal cross-sectional view, and FIG. 4 is the cross-sectional view taken along a line A-A of FIG. 3.

A grease gun 1 includes a main body housing 2 formed by assembling right and left half housings 2a and 2b. A tubular motor housing portion 3 is formed at the lower portion of the main body housing 2, a grip portion 4 is formed at the top in a front-rear direction, and front and rear ends of the grip portion 4 are coupled to the motor housing portion 3 in a loop shape. The motor housing portion 3 internally houses a DC motor 5 in a posture with an output shaft 6 facing the front, and a gear housing 7 that houses a deceleration mechanism 8 is assembled to the front of the DC motor 5. A cylindrical front holder 9 that projects downward and opens rearward is formed at the front portion of the gear housing 7, and a rear holder 10 that projects downward and has a through-hole 11 is formed at the rear portion of the motor housing portion 3. The front holder 9 and the rear holder 10 support a tank 12 as a grease supply means in the front-rear direction.

Meanwhile, the grip portion 4 internally houses a switch 13 where a trigger 14 is projected downward, a light 15 using an LED is disposed at the front of the grip portion 4 and on the front face of the main body housing 2, and a light switch 16 to perform an ON/OFF operation of the light 15 is disposed at the front top face of the main body housing 2. A lock-on button 17 with which a push-in state of the trigger 14 can be maintained is disposed at the front of the trigger 14 and at the grip portion 4.

A battery mounting portion 18 is formed at the rear of the grip portion 4 and on the main body housing 2. In the battery mounting portion 18, a controller 19 and a terminal block 20 are arranged in the front-rear direction and housed in an upper and lower direction. A battery pack 21 serving as a power supply is slidably mountable to the terminal block 20 from upward.

Furthermore, intake ports 22 that suction external air by a rotation of a fan (not illustrated) disposed at the DC motor 5 are formed at right and left side faces of the battery mounting portion 18 and at the rear portion, and the intermediate portion on the right and left side faces of the motor housing portion 3. Exhaust ports 23 that eject air after cooling the DC motor 5 are formed between the front and the rear intake ports 22 and on the right and left side faces of the motor housing portion 3.

The deceleration mechanism 8 is configured by axially arranging carriers 25, which support respective planetary gears 26, side by side in three stages inside an internal gear 24 held to the rear portion of the gear housing 7. The planetary gears 26 at the final stage mesh with a pinion 27 disposed at the output shaft 6, and the carrier 25 at the most front stage is coupled to a spindle 28, which is supported by front and rear bearings 29 and 29 inside the gear housing 7. A crank plate 30 where an eccentric pin 31 is projected forward is fixedly secured to the front end of the spindle 28. A slider 32 having an elongate hole 33 in the right-left direction is supported to be movable in the upper and lower direction between support plates 34 and 34 disposed to the right and the left at the front portion of the gear housing 7 in front of the crank plate 30. The eccentric pin 31 is movably inserted into the elongate hole 33 on the slider 32 via a roller 35, and an upper end of a rod-shaped plunger 36 extending in the upper and lower direction is coupled to the lower end center of the slider 32. A cover 37 is screwed between the front ends of the support plates 34 and 34 to cover a crank mechanism including the crank plate 30 and the slider 32 from the front side.

Accordingly, when the crank plate 30 is rotated together with the spindle 28, the slider 32 reciprocates in the upper and lower direction by an eccentric motion of the eccentric pin 31 by the amount of movement of the eccentric pin 31 in the upper and lower direction. Thus, the plunger 36 moves in the upper and lower direction.

The front holder 9 of the gear housing 7 internally includes a pump 40 that discharges the grease supplied from the tank 12 by the movement of the plunger 36 in the upper and lower direction. The pump 40 is constituted including an upper tubular portion 41 and a lower tubular portion 42. The upper tubular portion 41 projects downward from the upper inner surface of the front holder 9. The lower tubular portion 42 projects upward from the lower inner surface of the front holder 9 coaxially with the upper tubular portion 41 and has a clearance 43 with the upper tubular portion 41 to communicate with the inside of the front holder 9. The plunger 36 is inserted through the upper tubular portion 41 and the lower tubular portion 42 and moves in the upper and lower direction. The lower end of the plunger 36 approximately sinks into the upper tubular portion 41 upward with respect to the clearance 43 at a top dead center, and the lower end reaches up to the approximately intermediate portion inside the lower tubular portion 42 at a bottom dead center. A longitudinal discharge path 44 which communicates with the clearance 43 and through which the plunger 36 is inserted is formed inside the lower tubular portion 42.

The longitudinal discharge path 44 internally includes a check valve 45 formed of a valve seat 46, a steel ball 47, a coil spring 48, and a holding bolt 49. The valve seat 46 is disposed downward with respect to the lower end of the plunger 36 at the bottom dead center. The steel ball 47 is configured to open and close the valve seat 46. The coil spring 48 biases the steel ball 47 to a valve closed position of the valve seat 46 below the steel ball 47. The holding bolt 49 holds the coil spring 48 to obstruct the lower portion of the longitudinal discharge path 44.

A lateral discharge path 50 that communicates with the longitudinal discharge path 44 at a position downward with respect to the valve seat 46 of the check valve 45 is formed facing the front at the lower tubular portion 42. A discharge path for grease is formed by the longitudinal discharge path 44 and the lateral discharge path 50. A hose 51, which faces the front, is coupled to the front face of the front holder 9 which serves as the outlet of the lateral discharge path 50.

Accordingly, when the plunger 36 moves backward to the top dead center, the grease in the front holder 9 flows into the longitudinal discharge path 44 of the lower tubular portion 42 via the clearance 43. When the plunger 36 moves forward to the bottom dead center, the grease in the longitudinal discharge path 44 is pushed, the steel ball 47 is pressed down against the bias from the coil spring 48 to open the valve seat 46, and the grease is extruded to the lateral discharge path 50 and discharged from the hose 51.

The front holder 9 includes a relief valve 55, an air valve 56, and a safety valve 57.

First, as also illustrated in FIG. 5A, the relief valve 55 is screwed from the right side face of the front holder 9 at the position of the lower tubular portion 42 and projects to the inside of the front holder 9 and includes a main body 60, a valve element 61, and a coil spring 62. The main body 60 has a tubular body having the distal end with a diameter slightly smaller than that of a clearance depressed portion 52 disposed at the side face of the lower tubular portion 42. The valve element 61 is housed inside the main body 60 so as to be axially movable in the front-rear direction (the left-right direction in FIG. 5A). The coil spring 62 biases the valve element 61 to the distal end side inside the main body 60.

The main body 60 includes an internal flow passage 63, which houses the valve element 61, a front flow passage 64, which opens the internal flow passage 63 to the distal end of the axis center, and a lateral flow passage 65, which opens the internal flow passage 63 to the side faces, and these flow passages form a release flow passage to release the grease to the tank 12 side.

A communication passage 53 is formed at the lower tubular portion 42 so as to communicate between the longitudinal discharge path 44 and the clearance depressed portion 52 at the upstream side with respect to the steel ball 47 in the check valve 45. The communication passage 53 is disposed opposite to the front flow passage 64 of the main body 60. The communication passage 53 and the clearance depressed portion 52 form a communication flow passage that communicates between the longitudinal discharge path 44 and the tank 12 side. The right end of the main body 60 is exposed to the outside of the front holder 9, disposing a large-diameter operating portion 66.

The rear end of the internal flow passage 63 is obstructed by a close plug 67 obstructs.

The valve element 61 has a large diameter portion 68 on the front flow passage 64 side and holds a steel ball 69 in the projecting state at the distal end of the large diameter portion 68. In an ordinary state, the coil spring 62 biases the valve element 61 to the valve closed position where the steel ball 69 is seated on an opening of the front flow passage 64 to obstruct the front flow passage 64. A clearance through which the grease is passable is formed between the internal flow passage 63 and the large diameter portion 68.

The relief valve 55 is moved by screw-feeding with respect to the front holder 9, which is caused by the rotating operation of the main body 60 with the operating portion 66, so as to select an automatic switch position and a manual open position. At the automatic switch position, the distal end of the main body 60 abuts on the bottom surface of the clearance depressed portion 52, and the communication passage 53 communicates with only the front flow passage 64. At the manual open position, the distal end of the main body 60 separates from the bottom surface of the clearance depressed portion 52, and the communication passage 53 is opened to the inside of the clearance depressed portion 52 and communicates with the inside of the front holder 9 from the clearance with the main body 60.

With the automatic switch position selected, when pressure inside the front flow passage 64 communicated with the longitudinal discharge path 44 via the communication passage 53 falls below the biasing force from the coil spring 62, the front flow passage 64 is obstructed by the steel ball 69 of the valve element 61. When the pressure inside the front flow passage 64 exceeds the biasing force from the coil spring 62, the valve element 61 retreats together with the steel ball 69 against the bias from the coil spring 62 and the front flow passage 64 is opened. Accordingly, the grease flowing from the communication passage 53 via the front flow passage 64 passes through the internal flow passage 63 of the main body 60 and returns to the inside of the front holder 9 from the lateral flow passage 65, thus releasing the pressure inside the longitudinal discharge path 44.

Meanwhile, with the manual open position selected, by the main body 60 separating from the bottom surface of the clearance depressed portion 52, the communication passage 53 communicates with a space inside the front holder 9 via the clearance between the inner surface of the clearance depressed portion 52 and the main body 60. Accordingly, the grease inside the longitudinal discharge path 44 is constantly released to the inside of the front holder 9 from the communication passage 53 via the clearance depressed portion 52 with this clearance. The released amount is adjustable by the configuration of the clearance between the main body 60 and the bottom surface of the clearance depressed portion 52.

At both of these automatic switch position and manual open position, the amount of discharge of the grease is changeable (automatically at the automatic switch position and by the manual adjustment at the manual open position) with a count of reciprocations per unit time of the plunger 36 constant by the relief valve 55. That is, the relief valve 55 serves as an amount-of-discharge change means of the disclosure.

Next, the air valve 56 includes a holding pipe 70 and a screw shaft portion 71. The holding pipe 70 is coupled to the front face of the front holder 9 from the front side on a side opposite to the relief valve 55 between which the lower tubular portion 42 is sandwiched and communicates with the inside of the front holder 9. The screw shaft portion 71 is screwed into the holding pipe 70, and a valve element 71a is projected to the inner side of the front holder 9. A vent flow passage 72 communicating with the inside of the front holder 9 is formed at the inside of the holding pipe 70, and an opening 73 to open the vent flow passage 72 to the outside of the front holder 9 is disposed at the side face of the holding pipe 70. An O-ring 74 seals between the valve element 71a and the opening 73.

The valve element 71a is disposed on the front holder 9 side with respect to the opening 73 in the ordinary state and obstructs between the vent flow passage 72 and the opening 73. To vent the air from the front holder 9, the valve element 71a is screw-fed with respect to the holding pipe 70 by the rotating operation of the screw shaft portion 71 so as to be moved until the opening 73 communicates with the vent flow passage 72. Accordingly, the internal air is released from the opening 73 to the outside, and a poor discharge due to a so-called air entrainment is solved, making satisfactory grease discharge possible.

Next, as also illustrated in FIG. 5B, the safety valve 57 is formed at the downstream side with respect to the valve seat 46 of the check valve 45 in the longitudinal discharge path 44. The safety valve 57 is shifted by 90° phase from the lateral discharge path 50 and faces the left to the lower tubular portion 42. The safety valve 57 opens and closes a release path 75 communicating with the internal space of the front holder 9. The safety valve 57 is constituted including a support cylinder 76, a bolt 77, which is screwed into the support cylinder 76 from the outer end, a coil spring 78, which is disposed at the distal end side of the bolt 77, and a steel ball 79. The support cylinder 76 protrudes at the left side face of the lower tubular portion 42 coaxially with the release path 75 and projects to the outside of the front holder 9. The steel ball 79 obstructs the opening of the release path 75 by the coil spring 78. An open portion 80, which is formed at the support cylinder 76 inside the front holder 9, communicates between the inside of the support cylinder 76 and the inside of the front holder 9 at the bolt 77 side with respect to the steel ball 79.

In the ordinary state, the safety valve 57 is in the valve-closed state where the release path 75 is obstructed by the steel ball 79 biased from the coil spring 78. When the pressure in the lateral discharge path 50 increases and exceeds the biasing force from the coil spring 78, the steel ball 79 separates from the release path 75 against the bias from the coil spring 78. Then, the release path 75 is opened to the inside of the support cylinder 76 to communicate with the inside of the front holder 9 via the open portion 80, thus releasing the pressure in the lateral discharge path 50.

The tank 12 has a shape of a cylinder with a closed bottom with the front face opened. The tank 12 penetrates through the through-hole 11 on the rear holder 10 of the main body housing 2 from rearward and the front end of the tank 12 is screwed with the front holder 9, then the tank 12 is coupled to the main body housing 2 below the motor housing portion 3 with a posture facing forward. The tank 12 internally houses a rod 81 including a piston 82 at the front end to be movable in the front-rear direction, and a handlebar 84 is disposed at the rear end of the rod 81 projected from a through hole 83 disposed at the rear end of the tank 12. A coil spring 85 is disposed at the rear of the piston 82 inside the tank 12 to bias the piston 82 forward. Narrowed portions 86 are disposed at predetermined intervals on the outer periphery of the rod 81. The rod 81 is retreated and the narrowed portion 86 is locked to the through hole 83 on the tank 12, then the piston 82 is positioned at the intermediate position inside the tank 12 against the bias from the coil spring 85.

In the grease gun 1 configured as described above, when the tank 12 is coupled to the main body housing 2 while the front side of the piston 82 retreated at the inside of the tank 12 is filled with the grease, the piston 82 pushes the grease by the coil spring 85 to fill the inside of the front holder 9 with the grease.

When a push-in operation on the trigger 14 is performed in this state and the DC motor 5 is driven, the rotation of the output shaft 6 is decelerated by the deceleration mechanism 8, and the rotation is transmitted to the spindle 28 to rotate the crank plate 30 in deceleration together with the spindle 28. Then, the eccentric motion of the eccentric pin 31 moves the slider 32 in the upper and lower direction, and the plunger 36 is caused to reciprocate in the upper and lower direction together with the slider 32. Accordingly, when the plunger 36 reaches the top dead center, the grease flows from the clearance 43 between the upper tubular portion 41 and the lower tubular portion 42 into the longitudinal discharge path 44 in the lower tubular portion 42 in the pump 40. After that, by the plunger 36 moving to the bottom dead center, the grease pushed into the lower side inside the longitudinal discharge path 44 presses down the steel ball 47 in the check valve 45 to open the valve seat 46, flows in the lateral discharge path 50, and then is directly discharged via the hose 51. This discharge behavior is repeated in association with the reciprocation of the plunger 36.

At this time, with the relief valve 55 at the automatic switch position, as illustrated in FIG. 5A, while a load pressure during the discharge behavior is comparatively small and the pressure inside the front flow passage 64 of the main body 60 falls below the biasing force from the coil spring 62, the front flow passage 64 is obstructed by the steel ball 69 of the valve element 61. Accordingly, the grease discharged from the pump 40 becomes the high amount of discharge (the low pressure).

When the load pressure increases and the pressure inside the front flow passage 64 exceeds of biasing force from the coil spring 62, as illustrated in FIG. 6A, the valve element 61 retreats together with the steel ball 69 against the bias from the coil spring 62 to open the front flow passage 64. Accordingly, as indicated by the arrow in FIG. 6B, the grease flown from the front flow passage 64 passes through the internal flow passage 63 of the main body 60 and returns to the inside of the front holder 9 from the lateral flow passage 65, thus releasing the pressure inside the longitudinal discharge path 44. Since this behavior of the relief valve 55 actually reduces a stroke of the plunger 36 to half, the grease discharged from the pump 40 becomes the low amount of discharge (the high pressure).

Meanwhile, as illustrated in FIG. 7A, with the relief valve 55 at the manual open position, the communication passage 53 constantly communicates with the inside of the front holder 9 via the clearance depressed portion 52. Accordingly, as indicated by the arrow in FIG. 7B, since the grease passing through the clearance depressed portion 52 from the communication passage 53 and returning to the inside of the front holder 9 is present, the grease discharged from the pump 40 becomes the low amount of discharge. The released amount is changeable by the configuration of the clearance between the main body 60 and the bottom surface of the clearance depressed portion 52, therefore, a degree of freedom of configuration increases.

In the case where the air accumulates at the inside of the front holder 9, as illustrated in FIG. 8A, the valve element 71a is screw-fed and moved by the rotating operation of the screw shaft portion 71 in the air valve 56 and the vent flow passage 72 is communicated with the opening 73. Then, as indicated by the arrow in FIG. 8B, the accumulated air is ejected from the vent flow passage 72 to the outside via the opening 73.

Figure 9A:
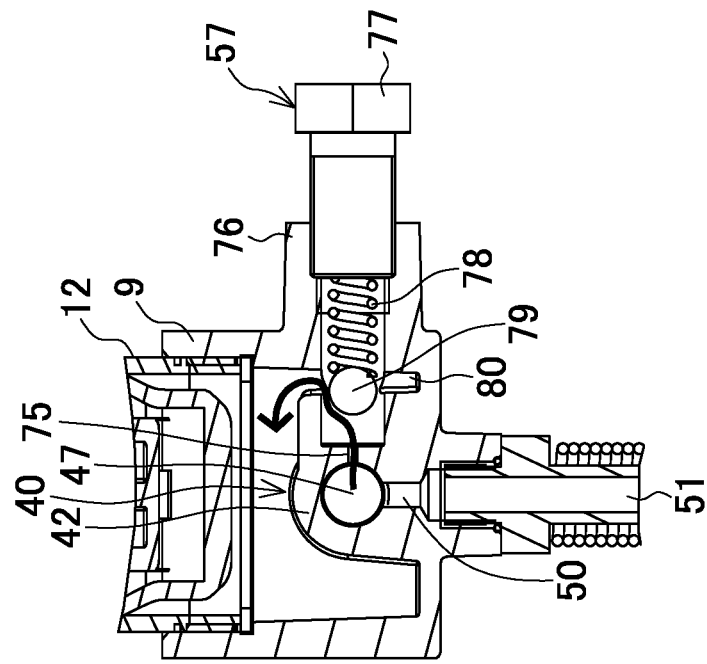
FIGS. 9A and 9B are explanatory diagrams of a safety valve.
Figure 9B:
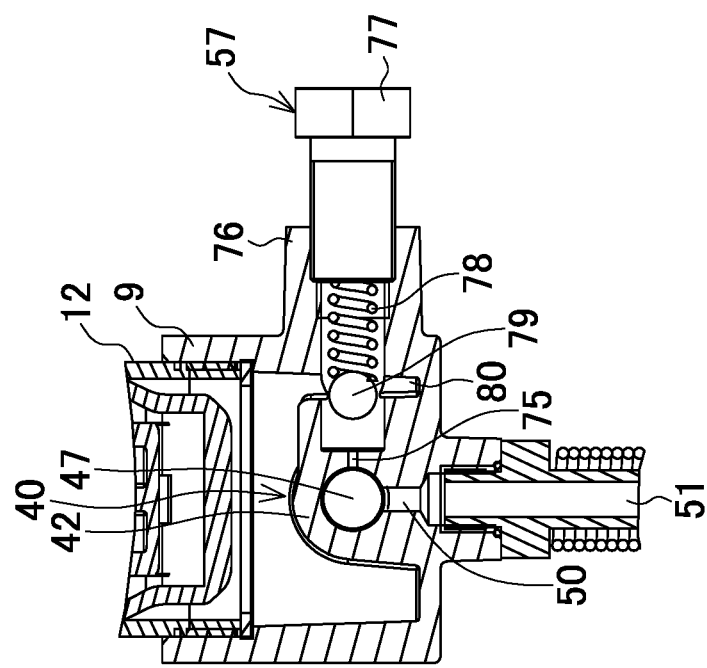

Meanwhile, in the case where the pressure in the lateral discharge path 50 becomes excessively high, as illustrated in FIG. 9A, the steel ball 79 retreats against the bias from the coil spring 78 in the safety valve 57 and the release path 75 communicates with the inside of the front holder 9 via the open portion 80, therefore, as indicated by the arrow in FIG. 9B, the grease inside the lateral discharge path 50 returns to the inside of the front holder 9 via the release path 75, thus releasing the pressure inside the lateral discharge path 50.

Thus, according to the grease gun 1 with the configuration, the relief valve 55, which releases the grease inside the discharge path to the tank 12 side according to the pressure rise inside the discharge path (the longitudinal discharge path 44 and the lateral discharge path 50), is disposed between the grease supply portion (the clearance 43) from the tank 12 as the grease supply means and the check valve 45. Therefore, the change of the amount of discharge is facilitated. This configuration eliminates the need for the switch operation of the amount of discharge, ensuring preferably protecting the electronic material product.

Especially here, the relief valve 55 is constituted including the release flow passage (the internal flow passage 63, the front flow passage 64, and the lateral flow passage 65) communicating with the tank 12 side and the valve element 61, which automatically performs the open and close behaviors of the release flow passages according to the increase and decrease of the pressure inside the discharge path. Therefore, the amount of discharge is automatically changed in two stages, high and low.

The relief valve 55 is switched between the automatic switch position and the manual open position to make that selection between the automatic switch and the manual open possible as necessary, improving usability.

The positions of the relief valve, the air valve, and the safety valve are not limited to the configurations and are appropriately changeable, such as disposing the relief valve to the left side and the front side, disposing the air valve to the lateral side, and disposing the safety valve to the front side. The air valve and the safety valve may be omitted. Operation characteristics of the relief valve are changeable by changing the opening diameters of the front flow passage and the communication passage and changing the position of the communication passage in the upper and lower direction.

The structure of each valve is not limited to the configuration. For example, in the relief valve, the valve element may be constituted of only the steel ball, the valve element other than the steel ball may be employed, or the manual open is eliminated and the main body may be fixed at the automatic switch position to constantly perform the release behavior of the pressure automatically.

Conversely, the automatic switch can be eliminated, and the relief valve only with the manual open can be disposed.

Figure 10:
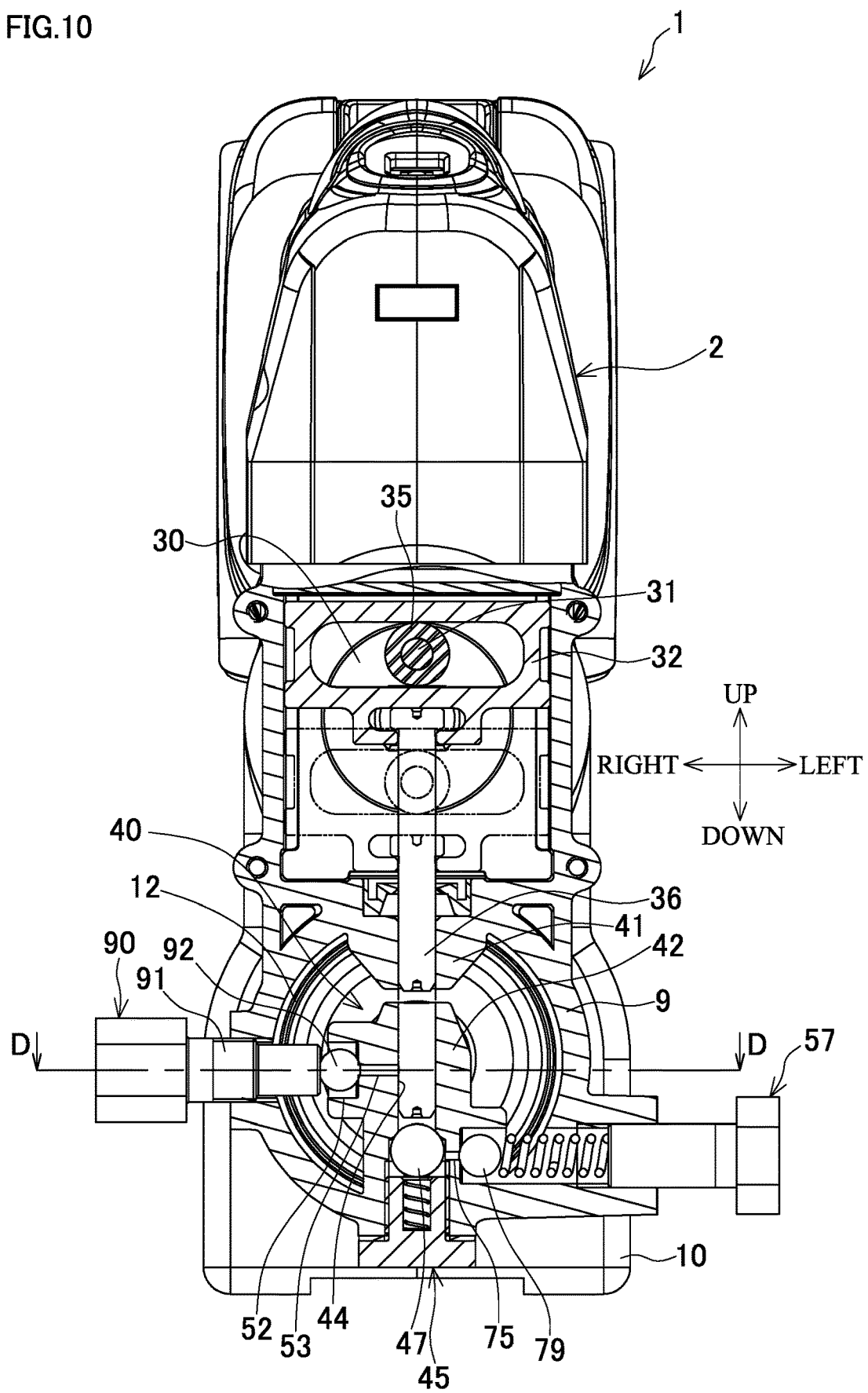
FIG. 10 is a cross-sectional view equivalent to FIG. 4 where a manual relief valve is disposed.
Figure 11:
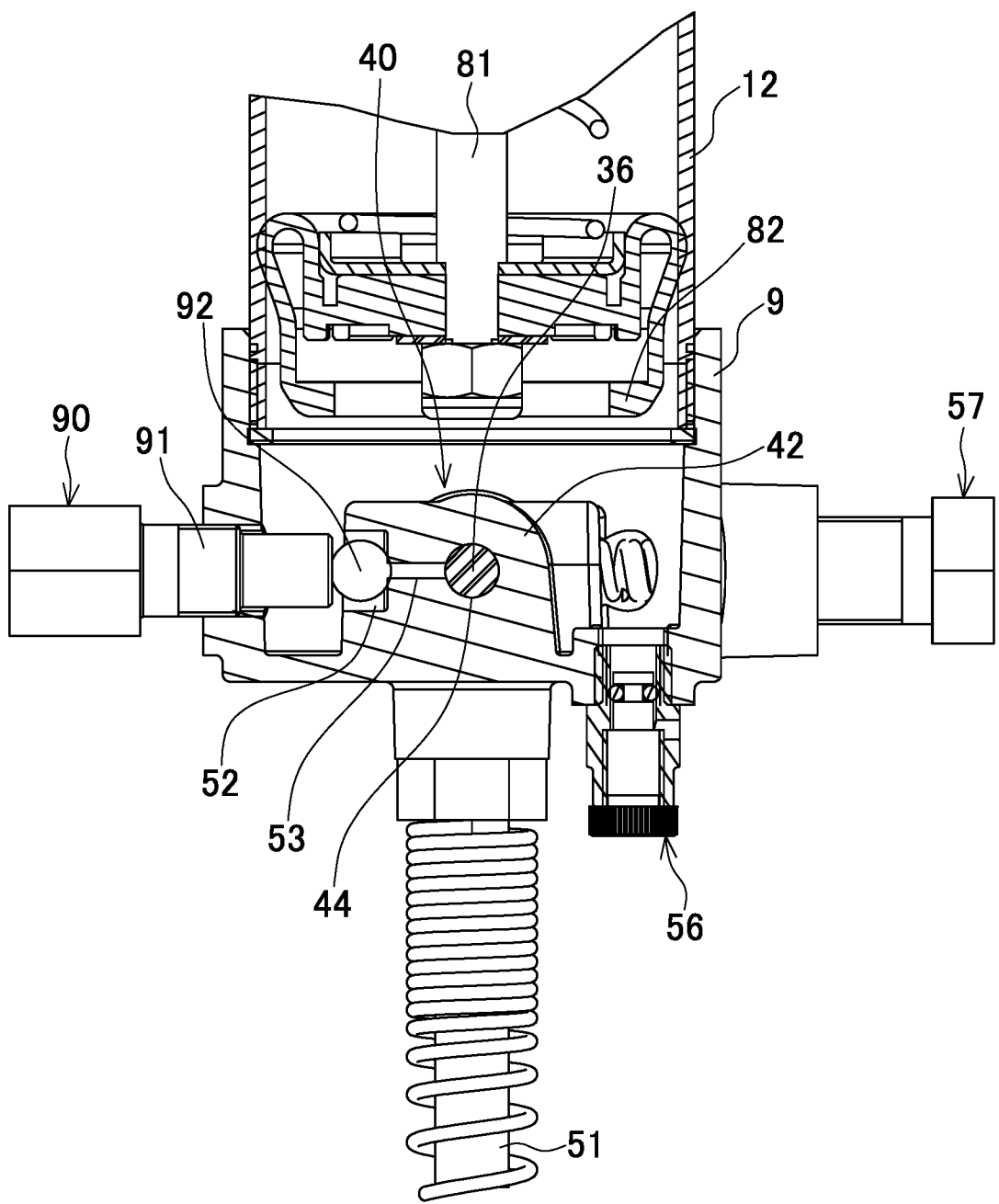
FIG. 11 is a cross-sectional view taken along a line D-D in FIG. 10.

FIG. 10 and FIG. 11 illustrate the one example. A relief valve 90 here is constituted including a steel ball 92 which can open and close the communication passage 53 at a distal end of a bolt 91 screwed from the right side face of the front holder 9 inside the clearance depressed portion 52. The steel ball 92 has a diameter smaller than the diameter of the clearance depressed portion 52.

Accordingly, as illustrated in FIG. 12A, a degree of opening where the steel ball 92 separates from the bottom surface of the clearance depressed portion 52 and the communication passage 53 communicates with the inside of the front holder 9 is adjustable. As indicated by the arrow in FIG. 12B, with the degree of opening (the released amount), the pressure inside the longitudinal discharge path 44 is constantly released from the communication passage 53 to the inside of the front holder 9 via the clearance depressed portion 52. The released amount is also adjustable by the configuration of the clearance between the steel ball 92 and the bottom surface of the clearance depressed portion 52.

By thus configuring the relief valve 90 as the manually operated valve that can adjust the degree of opening of the communication flow passage (the communication passage 53 and the clearance depressed portion 52) disposed at the pump 40, which communicates the discharge path (the longitudinal discharge path 44 and the lateral discharge path 50) and the tank 12 as desired, the amount of discharge can be easily changed and the degree of freedom of the adjustment of the released amount is enhanced.

Meanwhile, the amount-of-discharge change means is not limited to the relief valve with the configuration, and, for example, it is also possible to set an amount of eccentricity of the eccentric pin with respect to the crank plate variable and change the amount of discharge by the adjustment of the amount of eccentricity. That is, the small amount of eccentricity shortens the stroke of the plunger and decreases the amount of discharge, and the large amount of eccentricity increases the stroke of the plunger and increases the amount of discharge. To change the amount of eccentricity, it is considered to prepare a plurality of sets of the crank plates and the eccentric pins of different amounts of eccentricity for exchange and provide a plurality of mounting positions of the eccentric pin with respect to the crank plate for selection of the mounting position of the eccentric pin.

It is also possible to configure the position of the lower tubular portion forming the pump to be changeable in the upper and lower direction and change the amount of discharge by the adjustment of the position of the lower tubular portion. That is, when the lower tubular portion is disposed on the upper side, the inserted part of the plunger is increased and the amount of discharge is increased, and when the lower tubular portion is disposed on the lower side, the inserted part of the plunger is decreased and the amount of discharge is decreased. To change the position of the lower tubular portion, it is considered to configure the lower tubular portion to be slidable in the upper and lower direction inside the front holder and fixable at any position or select a mounting position of a separate lower tubular portion from a plurality of mounting positions inside the front holder and fix the lower tubular portion.

Furthermore, it is also possible to change the amount of discharge by configuring the length of the plunger to be changeable. That is, the long plunger increases the amount of discharge and the short plunger decreases the amount of discharge. To change the length of the plunger, it is considered to prepare a plurality of plungers with different lengths so as to be exchangeable and the plunger itself has an extendable structure.

Besides, the structure is appropriately changeable, for example, the tank being supported in the upper and lower direction, not the front-rear direction and the motor housing portion and the grip portion being formed in the upper and lower direction, and a commercial power supply being used, not a battery pack.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A grease discharge device comprising:
a motor;
a plunger that reciprocates by driving of the motor;
a grease supply unit that supplies grease to a forward movement side with respect to a backward movement side dead center of the plunger;
a pump that performs a discharge behavior of the grease by the reciprocation of the plunger;
a check valve disposed at a downstream side with respect to a forward movement side dead center of the plunger in a discharge path of the grease inside the pump;
a first relief valve disposed between a supply portion of the grease by the grease supply unit and the check valve, the first relief valve releasing the grease inside the discharge path to the grease supply unit side according to a pressure rise inside the discharge path; and
a second relief valve (1) disposed downstream of the check valve and (2) configured to release the grease within an exit path from the check valve to an exterior of the grease discharge device to an interior of the grease discharge device when pressure within the exit path exceeds a predetermined pressure.

2. The grease discharge device according to claim 1, wherein
the first relief valve is constituted including a release flow passage and a valve element, the release flow passage communicating with the grease supply unit side, the valve element automatically performing an open and close behavior of the release flow passage according to increase and decrease of the pressure inside the discharge path.

3. The grease discharge device according to claim 2, wherein
the valve element holds a steel ball at a distal end thereof, the steel ball being seated on the release flow passage.

4. The grease discharge device according to claim 2, wherein
the valve element is housed inside a main body where the release flow passage is formed such that the valve element is configured to perform the open and close behavior, the valve element being biased to a valve closed position in the release flow passage with an elastic member.

5. The grease discharge device according to claim 4, wherein
the elastic member is a coil spring.

6. The grease discharge device according to claim 4, wherein:
the main body has a tubular body screwed with a holder that houses the pump, the main body having a distal end projecting to an inside of the holder, and
a degree of opening of a communication flow passage disposed at the pump is adjustable as desired by a rotating operation of the main body, the communication flow passage communicating between the discharge path and the grease supply unit.

7. The grease discharge device according to claim 6, wherein
the communication flow passage is constituted including a clearance depressed portion and a communication passage, the clearance depressed portion being disposed at the pump and having a diameter larger than a diameter of the distal end of the main body, the communication passage communicating between the clearance depressed portion and the discharge path.

8. The grease discharge device according to claim 6, wherein
the pump is constituted including an upper tubular portion through which the plunger is insertable and a lower tubular portion, the upper tubular portion projecting downward from an upper inner surface of the holder, the lower tubular portion projecting upward from a lower inner surface of the holder coaxially with the upper tubular portion, the lower tubular portion having a clearance with the upper tubular portion to communicate with the inside of the holder, the lower tubular portion forming the discharge path communicating with the clearance, the plunger being inserted through the discharge path.

9. The grease discharge device according to claim 8, wherein
the grease supply unit is a tank having a front end coupled to the holder to be supported in a front-rear direction.

10. The grease discharge device according to claim 4, wherein
the release flow passage is constituted including an internal flow passage, a front flow passage, and a lateral flow passage, the internal flow passage housing the valve element, the front flow passage opening the internal flow passage to the distal end of the main body, the lateral flow passage opening the internal flow passage to a side face of the main body.

11. The grease discharge device according to claim 10, wherein
a clearance through which the grease is passable is formed between the valve element and the internal flow passage.

12. The grease discharge device according to claim 1, wherein
the first relief valve is a manually operated valve configured to adjust a degree of opening of a communication flow passage disposed at the pump as desired, the communication flow passage communicating between the discharge path and the grease supply unit.

13. The grease discharge device according to claim 1, wherein the grease that is released by the second relief valve is released to a housing that house the pump.

14. A grease discharge device comprising:
a motor;
a plunger that reciprocates by driving of the motor;
a grease supply unit that supplies grease to a forward movement side with respect to a backward movement side dead center of the plunger;
a pump that performs a discharge behavior of the grease by the reciprocation of the plunger;
a check valve disposed at a downstream side with respect to a forward movement side dead center of the plunger in a discharge path of the grease inside the pump;

a relief valve disposed between a supply portion of the grease by the grease supply unit and the check valve, the relief valve releasing the grease inside the discharge path to the grease supply unit side according to a pressure rise inside the discharge path; and an air relief valve configured to release air from a housing that houses the pump.

15. The grease discharge device according to claim 14, wherein the relief valve and the air relief valve both have an opening into a same chamber of the housing.

16. The grease discharge device according to claim 14, wherein the air relief valve is configured to be operated by a user of the grease discharge device.

* * * * *